3,056,690
STOP LEAK COMPOSITION AND PROCESS
Charles G. Welch, Hoboken, N.J., assignor to Xzit Brickseal Co., Hoboken, N.J., a corporation of New Jersey
No Drawing. Filed Apr. 27, 1960, Ser. No. 24,922
8 Claims. (Cl. 117—2)

The present invention relates to a stop leak process and composition and more particularly to a process and composition that will effectively seal leaks in systems where heat is either existing on the outer surface or heat can be applied to such a surface.

Many cooling systems develop leaks during operating periods and either require shutdown to repair the leak or the replacement of a unit to eliminate the water leak. The problem is particularly acute in blast furnace cooling water systems where the area being cooled by the water cooling system presents extremely high temperatures ranging up to 3200° F. Under such conditions, previously proposed stop leaks have failed either due to the high temperatures or the chemical oxidation effect existing in the area and surface being cooled.

It is therefore an object of the present invention to provide a stop leak composition suitable for effectively sealing leaks on surfaces exposed to high temperatures.

A further object of the present invention is to provide a method of stopping leaks in systems where high temperatures exist.

A still further object of the present invention is to provide a method of stopping leaks in blast furnace cooling water systems.

A still further object of the present invention is to provide a composition and method of using it to stop leaks in any liquid systems.

Another object of the invention is to provide a stop leak composition that has sealing, adhesive, expansion, and high heat resisting qualities.

A still further object of the invention is to provide a method of repairing and sealing leaks in a furnace cooling system while the furnace is in operation and the cooling system is performing its cooling function.

Other objects and the nature and advantages of the instant invention will be apparent from the following description.

After considerable research and study, together with actual field study and experimentation in the steel plant, the following method and composition have been developed to solve this highly complex maintenance and repair problem.

The method will first be described in connection with the repair and sealing of leaks in Bosh and tuyere cooling plates while the furnace is in operation. The leaking unit is isolated from the main cooling system by a bypass piping and valving arrangement. The composition in accordance with this invention in water solution is then circulated through the bypassed leaking unit. The composition thus is permitted to seep out through the ruptured hole, crevice or capillary area and to seal such area against further leakage. The composition, in contact with the heat of the furnace, becomes solidified and seals the leak. The solidified product is not thereafter affected by high temperature or chemical oxidizing attack. Upon solidification, the product is no longer affected by water and therefore resists dissolving or washing out.

The composition utilized is a mixture of colloidal silica and casein in the following range of proportions:

|  | Percent by volume |
|---|---|
| Colloidal silica | 70–99 |
| Casein | 1–30 |

This composition is mixed with water in the following proportions:

|  | Percent by volume |
|---|---|
| Composition | 5–50 |
| Water | 50–95 |

A specific example which has proven particularly successful is a mixture of

|  | Percent by volume |
|---|---|
| Colloidal silica | 90 |
| Casein | 10 |

This mixture is added to water in the proportion of 10 parts by volume of mixture to 90 parts by volume of water.

The resulting emulsion is circulated through the pipe containing the leak for about an hour or until the leak is sealed off. The heat of the furnace causes the composition seeping through the leak to gum up and solidify into a resistant product that effectively stops the leak.

There are a number of suitable colloidal dispersions of silica available commercially. A particularly suitable dispersion is that known as Ludox, manufactured by Du Pont, which contains approximately 30% silica and may be readily diluted with water, as desired.

The term "colloidal silica" refers to colloidal dispersions of silica wherein the particles of silica in the dispersion are amorphous, dense, non-agglomerated, spherical particles having an average diameter in the order of 15 millimicrons. The particle size may vary within the range of 1 millimicron to 150 millimicrons, and the dispersion may contain from 7% to about 48% by weight of silica.

This method is effective in any areas where heat continually exists on the opposite surface of a cooling system as in blast furnace, Bosh cooling plates, low pressure boilers, waste heat boilers, diesel jacketing cooling systems on the combustion side and the like.

This composition is also effective for stopping leaks in areas where no heat exists as in water cooling systems or any piping. In such cases where the leaks occur in piping or water contained units where exposed areas can be reached with an external torch heat, the following procedure can be used. The leaking unit should be isolated and the product as described heretofore is contained in the area to be sealed against leak. Preferably a pump should be used to circulate the sealing composition through the unit. A blow torch flame should be directly applied against the leaking hole where the solution is leaking out. Gradually the hole will begin to seal through the action of solidification. The heat should preferably be continued for at least 15 minutes after the leak is completely stopped and any traces of moisture appear to exist. Following this action, the composition is drained from the unit repaired, the unit is flushed out and restored to service.

When leaks occur in oil piping, containers, tanks and equipment that can be isolated and filled with water, the same method as described above can be used to seal the oil leaks. After the leak is stopped, the water can be drained off and the unit cleaned out before it is restored to oil service. The sealing compound once it reaches solidified state is completely insoluble in oil.

Where the leaking unit in a cooling system is to be isolated from the main cooling system, the general piping, valving and by-pass arrangements depend upon the design and pattern in which the cooling units are grouped.

The composition used in this invention will solidify when exposed to a temperature range of from approximately 750° F. up to the operating temperature of a blast furnace.

To prevent freezing of the composition, an alcohol or glycol anti-freeze can be added.

The composition has great adhesive properties and will adhere to surfaces of copper, brass, iron, steel and various metallic alloys. Due to its expanding and contracting properties, it will retain its sealing qualities over a wide range of temperatures and under thermal shock conditions.

This product and process can be used for chemically repairing blast furnace Bosh plates, heat exchangers, hot and cold water lines, water cooled engine blocks, tanks (both water and oil), pipe lines, condensers, heaters, water circulating systems, cooling systems, refrigerating brine systems and a myriad of other purposes where oil or water leaks occur.

It will be obvious to those skilled in the art that various changes may be made without departing from the spirit of the invention and therefore the invention is not limited to what is described in the specification, but only as indicated in the appended claims.

What is claimed is:

1. A method of stopping leaks in liquid systems made up of metal parts comprising isolating the portion of the system containing the leak from the remainder of the system, circulating an aqueous emulsion of a mixture of 70–99% by volume colloidal silica and 1–30% by volume casein through the portion of the system containing the leak, said aqueous emulsion containing 50–95% by volume water and 5–50% by volume of said mixture, and applying heat to the outside surface of the portion containing the leak in excess of approximately 750° F. at least until the leak has completely stopped.

2. A method in accordance with claim 1 wherein the aqueous emulsion contains a mixture of 90% by volume colloidal silica and 10% by volume casein.

3. A method in accordance with claim 1 wherein the aqueous emulsion contains 90% by volume water and 10% of a mixture of 90% by volume colloidal silica and 10% by volume casein.

4. A method of stopping leaks in liquid cooling systems made up of metal parts where the outside surfaces thereof are exposed to heat of at least 750° F. comprising isolating the portion of the system containing the leak from the remainder of the system, circulating an aqueous emulsion of a mixture of 70–99% by volume colloidal silica and 1–30% by volume casein through the portion of the system containing the leak until the leakage has completely stopped, said aqueous emulsion containing 50–95% by volume water and 5–50% by volume of said mixture.

5. A method in accordance with claim 4 wherein the aqueous emulsion contains a mixture of 90% by volume colloidal silica and 10% by volume casein.

6. A method in accordance with claim 4 wherein the aqueous emulsion contains 90% by volume water and 10% of a mixture of 90% by volume colloidal silica and 10% by volume casein.

7. A method of stopping leaks in liquid systems made up of metal parts comprising circulating an aqueous emulsion of a mixture of 70–99% by volume collodial silica and 1–30% by volume casein through the portion of the system containing the leak, said aqueous emulsion containing 50–95% by volume water and 5–50% by volume of said mixture, and applying the flame of a blowtorch to the outside surface of the portion containing the leak at least until the leak has completely stopped.

8. A method of stopping leaks in the liquid cooling systems of a furnace made up of metal parts which comprises circulating an aqueous emulsion of a mixture of 70–99% by volume colloidal silica and 1–30% by volume casein through the portion of the system containing the leak while the furnace is in operation until the leakage has completely stopped said aqueous emulsion containing 50–95% by volume water and 5–50% by volume of said mixture.

References Cited in the file of this patent

UNITED STATES PATENTS

| | | |
|---|---|---|
| 1,746,028 | Churchill | Feb. 4, 1930 |
| 1,891,506 | Sommers et al. | Dec. 20, 1932 |
| 2,737,500 | Nickerson | Mar. 6, 1956 |
| 2,799,658 | Nickerson | July 16, 1957 |
| 2,885,299 | Labino | May 5, 1959 |